United States Patent [19]

Hyppönen

[11] 4,385,988
[45] May 31, 1983

[54] PACKING ELEMENT FOR A BIOLOGICAL FILTER OR FOR USE IN MASS TRANSFER

[76] Inventor: Alpo Hyppönen, 6 kp, 37380 Viiala, Finland

[21] Appl. No.: 349,868

[22] Filed: Feb. 18, 1982

[30] Foreign Application Priority Data

Feb. 20, 1981 [FI] Finland .................................. 810534

[51] Int. Cl.³ ............................................. B01F 3/04
[52] U.S. Cl. ...................................... 210/150; D23/4; 55/90; 202/158; 261/94; 261/DIG. 72
[58] Field of Search ..................................... 261/94–98, 261/DIG. 72; 210/150, 151; D23/4; 202/158; 55/90

[56] References Cited

U.S. PATENT DOCUMENTS

| | | | |
|---|---|---|---|
| D. 232,236 | 7/1974 | La Borde | 261/DIG. 72 |
| 3,506,248 | 4/1970 | Starbuck et al. | 261/DIG. 72 |
| 3,549,044 | 12/1970 | Lerner | 261/DIG. 72 |
| 3,914,351 | 10/1975 | McKeown et al. | 261/DIG. 72 |
| 3,957,931 | 5/1976 | Ellis et al. | 261/98 |
| 4,122,011 | 10/1978 | Strigle, Jr. | 261/DIG. 72 |
| 4,195,043 | 3/1980 | Foote et al. | 261/94 |

FOREIGN PATENT DOCUMENTS

| | | | |
|---|---|---|---|
| 1439745 | 6/1976 | United Kingdom | 261/DIG. 72 |
| 1479656 | 7/1977 | United Kingdom | 261/DIG. 72 |
| 1498360 | 1/1978 | United Kingdom | 261/DIG. 72 |

Primary Examiner—Richard L. Chiesa
Attorney, Agent, or Firm—Gifford, Van Ophen, Sheridan & Sprinkle

[57] ABSTRACT

A packing element for a biological filter or for use in mass transfer has a plurality of trickling faces along which the liquid or gas to be treated flows. The faces are disposed on at least one rim of the element at an angle between 3° and 40° relative to the vertical axis of the element, and have relatively large surface areas. The apex angle of the element is about 140° to about 180°, the height of the element being greatest at its center portion. Rounded projecting portions cause randomly introduced elements to become oriented automatically so that the vertical axis is aligned with the liquid or gas flow and the element in a horizontal position. Additionally, a ductlike member is provided at the upper edge on at least one of the at least one rims, to more effectively distribute the liquid or gas flow on the trickling faces.

8 Claims, 5 Drawing Figures

PACKING ELEMENT FOR A BIOLOGICAL FILTER OR FOR USE IN MASS TRANSFER

BACKGROUND OF THE INVENTION

I. Field of the Invention

The present invention relates to packing element for a biological filter or for use in mass transfer wherein the liquid or gas to be purified is arranged to flow along the trickling faces of said packing element in contact with another medium, e.g. oxidizing air, said trickling faces having relatively large wet surface areas and being arranged at an angle of about 3°–40°, preferably 5°–15° with respect to the vertical axes of the element. This packing element can also be used in flue gas washing towers and in distillation columns.

II. Description of the Prior Art

Operation of a biological filter is based on the activity of micro-organisms occurring on the surface of the packing element in a filter. The effluent to be purified is evenly distributed upon the biological filter for packing elements. Effluent trickles down the surface and comes into intimate contact with upwardly flowing air.

A biological filter can be employed as a pretreatment stage or an actual biological treatment depending on loading. A biological filter system can be made more complete with chemical treatment.

Filters of the past were usually filled with rocks but those have been discarded mainly because of their poor efficiency, clogging hazard and great weight.

A more extensive application of biological filters has heretofore been impeded by the high price of filter material. However, plastic packing elements or bodies have changed this situation and made the use of biological filters more economical.

British Patent publication No. 1 498 360 discloses a plastic packing element comprising a cylindrical body fitted with a plurality of inclined ring elements mounted within each other. Since these packing elements are intended to be introduced into a filter vessel quite randomly, said ring elements are provided with relatively large openings and voids so that liquid can trickle as freely as possible through the layer formed by said packing elements. This means, however, that there will be no intact surfaces of any substantial size in any of the packing elements along which liquid could trickle in contact with oxidizing air.

British Patent publication No. 1 439 745 discloses a filter packing element comprising a cylinder or tube member which is provided with various spacing and filling means and whose wall can be perforated. The cylinder is of relatively great length and the fitting thereof in a filter may cause clogging of the flow.

SUMMARY OF THE PRESENT INVENTION

The object or the present invention is to provide a packing element for a filter of mass transfer, the wet surfaces of said element being of relatively large area to encourage the contact between a liquid or gas to be purified with another medium. Characteristic of the packing element of the invention is that the height of the packing element is about 20–60% of the outer dimension of the element, the maximum value of the height being in the center portion of the element. With such construction it has been found that, when these packing elements are freely overturned, most of them will end up in a substantially horizontal position. This means that liquid or gas will flow well along the top face of the surface but is also capable of flowing along the lower surface thereof thus wetting both sides of the trickling surface. This is the most effective way of utilizing said surface.

The trickling surface of the packing element preferably comprises a plurality of concentric circular, elliptical, triangular, quadratic or polygonal rims connected by intermediate ribs. These ribs may extend in radial or mainly radial direction. Also other directions are of course possible, providing that the ribs do connect the rims. Such arrangement provides as large a continuous trickling surface area as possible and the wet surface of said element will be of substantial area. In a preferred embodiment of the invention the number of rims is 1–5.

The efficiency of the packing element can be improved by providing the upper edge of one or several rims with a ductlike member. The purpose of that member is to improve the internal liquid distribution over the surfaces of the rims and to improve the mechanical strength of the element.

Efficiency of the packing element can be further increased by various treatments of trickling surfaces. The surfaces can be roughened, patterned, grooved, provided with ridges, projections or ribs. They can also be perforated or notched or provided with various openings. Naturally it is also possible to combine two or more of the above-mentioned surface patterns.

To facilitate horizontal positioning of the packing element, the height of said element decreases from central portion towards the outer rim, the apex angle of said element being preferably circa 140°–180°.

BRIEF DESCRIPTION OF THE DRAWING

The invention will now be described in more detail with reference to the accompanying drawings, in which.

DETAILED DESCRIPTION OF THE PREFERRED EMBODIMENT OF THE PRESENT INVENTION

Figure 1:
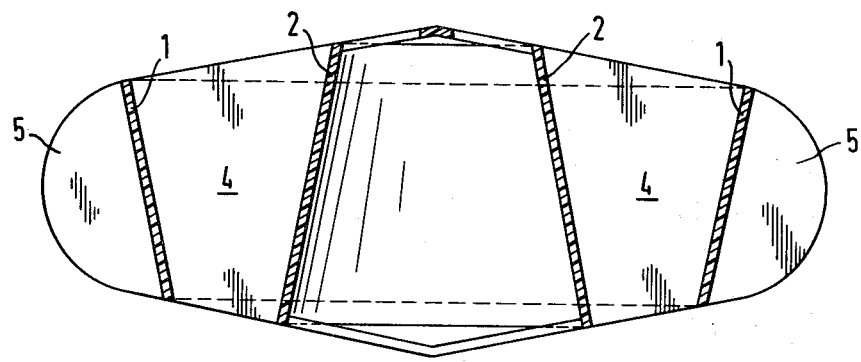
FIG. 1 shows a packing element of the invention in cross-section.
Figure 2:
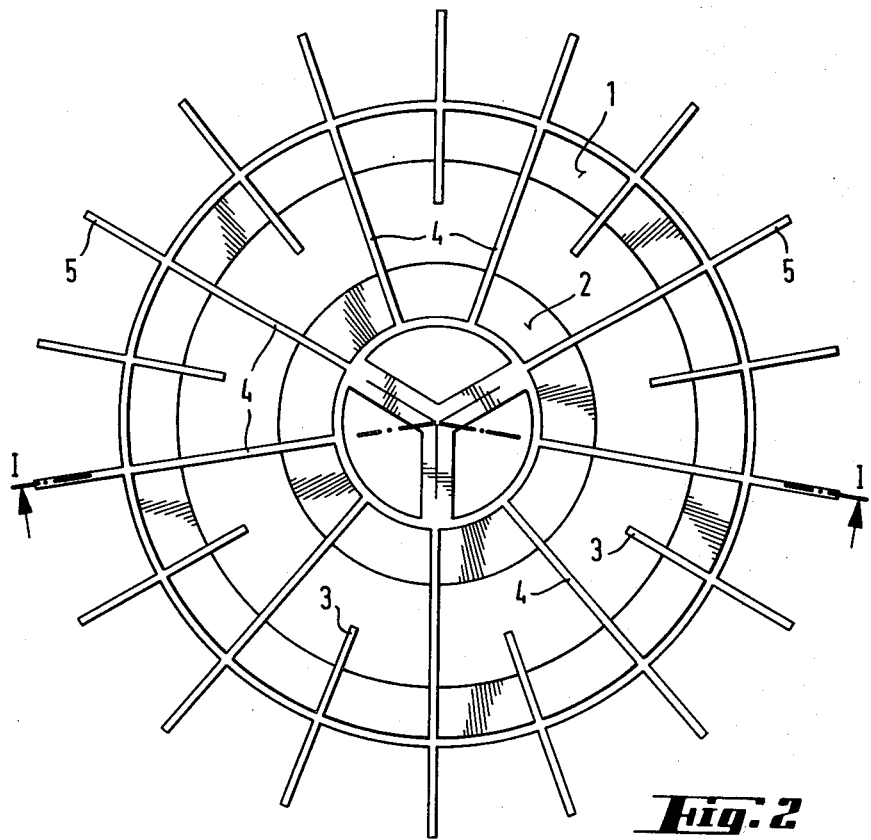
FIG. 2 is a plan view of the packing element of FIG. 1.

FIGS. 1 and 2 illustrate the main principles of a packing element of the invention. As viewed from above, the packing element comprises a disc-shaped element having an outer rim 1 and inner rim 2 connected by radial connecting ribs 4. Outer rim 1 is further provided with radial reinforcement ribs 3 located between connecting ribs 4. Ribs 3 and 4 extend beyond rim 1 and their projecting portion 5 is rounded. Ribs 3 and 4 also define the outline of said element as viewed in cross-section. In the embodiment shown in FIG. 1, the height of the element is at its greatest at the central portion and decreases towards the outer rim.

Rims 1 and 2 are mounted at an inclined angle so that a liquid to be purified can trickle along both the top and bottom side of surfaces 1 and 2 whereby a most effective use of the entire surface of the rims becomes possible. Angle of inclination is 12°. According to the invention, this angle of inclination is most preferably 0°–25° which has been found out experimentally. If the angle of inclination is considerably greater, the liquid flow disengages from the under side of the surface, particularly with major flow rates, in which case the wet surface naturally decreases in area.

Figure 3:
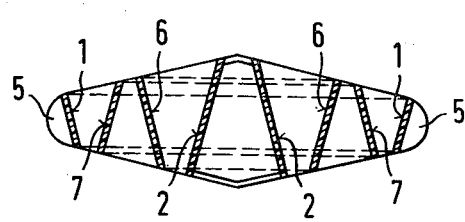
FIG. 3 shows a modified embodiment of the invention in cross-section.

FIG. 3 is a cross-sectional view of another embodiment of the invention in which a disc-shaped packing element is provided with two auxiliary rims 6 and 7 in addition to the outer and inner rims 1, 2. The rims connecting ribs 4 as well as reinforcement ribs 3 extend beyond outer rim 1 by their rounded portion 5.

Figure 4:
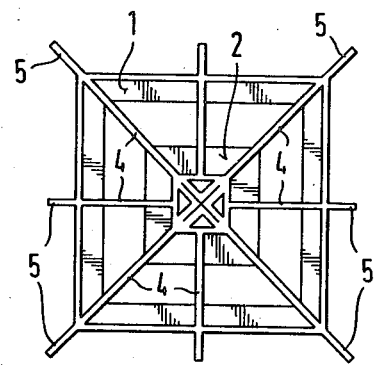
FIG. 4 is a plan view of one embodiment of the invention.

FIG. 4 shows a packing element whose rim configuration is quadratic. Even in this case, the outer and inner rims 1 and 2 are connected by connecting ribs 4 whose ends are provided with rounded portions 5 projecting beyond said outer rim 1.

Figure 5:
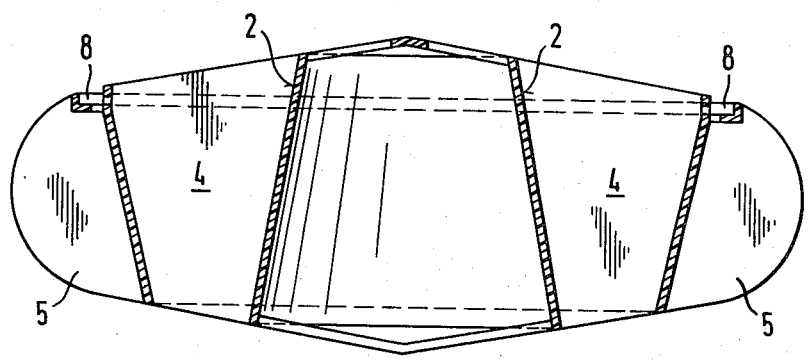
FIG. 5 is a plan view of a further embodiment of the invention.

A further embodiment of the invention is shown in FIG. 5. The construction of this element is the same as shown in FIGS. 1 and 2, except that the upper edge of the outer rim 1 is provided with a ductlike member 8. This member 8 forms a ringlike duct following the outer periphery of the rim 1. With this ductlike member 8 a more effective distribution of the liquid flow on the element is obtained. Additionally the ductlike member makes the element more rigid.

What I claim is:

1. A packing element for a biological filter or for use in mass transfer, said packing element having a center portion and a vertical axis associated therewith, said center portion additionally having an apex angle associated therewith, and said element additionally having a height and an outer dimension associated therewith, wherein said packing element comprises a multiplicity of trickling faces, and wherein the liquid or gas to be treated is arranged to flow along said trickling faces of said packing element in contact with another medium, said trickling faces having relatively large wettable surface areas and being angled at about 3° to about 40° with respect to said vertical axis of the element, characterized in that said height of said packing element is about 20% to about 60% of said outer dimension of said element, the maximum value of said height being at the center portion of the element, and further characterized in that the outer periphery of said element is provided with rounded portions projecting outwardly beyond said periphery.

2. A packing element according to claim 1, further characterized in that said apex angle of said element is between about 140° and about 180°.

3. A packing element according to claim 1, further characterized in that said trickling faces are angled at about 5° to about 15° with respect to said vertical axis.

4. A packing element for a biological filter or for use in mass transfer, said packing element having a center portion and a vertical axis associated therewith, said center portion additionally having an apex angle associated therewith, and said element additionally having a height and an outer dimension associated therewith, wherein said packing element comprises at least one rim upon which at least one of a multiplicity of trickling faces is disposed, and wherein the liquid or gas to be treated is arranged to flow along said trickling faces in contact with another medium, said trickling faces having relatively large wettable surface areas and being angled at about 3° to about 40° with respect to said vertical axis, characterized in that said height of said packing element is about 20% to about 60% of said outer dimension of said element, the maximum value of said height being at said center portion of said element, and further characterized in that at least one of said at least one rim has a ductlike member provided at the top edge thereof forming a duct along the outer periphery of said rim.

5. A packing element according to claim 4, further characterized in that said trickling faces are angled at about 5° to about 15° with respect to said vertical axis.

6. A packing element according to claim 4, further characterized in that said apex angle of said element is between about 140° and about 180°.

7. A packing element according to claim 4, further characterized in that the outer periphery of said element is provided with rounded projecting portions.

8. A packing element according to claim 7, further characterized in that said apex angle of said element is between about 140° and about 180°.

* * * * *

UNITED STATES PATENT AND TRADEMARK OFFICE
CERTIFICATE OF CORRECTION

PATENT NO. : 4,385,988
DATED : May 31, 1983
INVENTOR(S) : Alpo Hypponen

It is certified that error appears in the above—identified patent and that said Letters Patent is hereby corrected as shown below:

Column 1, Line 32 delete "heterofore" insert --heretofore--.

Signed and Sealed this

Twentieth Day of September 1983

|SEAL|

Attest:

GERALD J. MOSSINGHOFF

Attesting Officer     Commissioner of Patents and Trademarks